United States Patent
Rieger et al.

(10) Patent No.: US 6,673,268 B1
(45) Date of Patent: Jan. 6, 2004

(54) LIQUID-CRYSTALLINE MEDIUM

(75) Inventors: Bernhard Rieger, Kanagawa Pref. (JP); Atsushi Sawada, Kanagawa Pref. (JP); Hideo Ichinose, Kanagawa Pref. (JP); Herbert Plach, Darmstadt (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 0 days.

(21) Appl. No.: 08/459,128

(22) Filed: Jun. 2, 1995

Related U.S. Application Data

(63) Continuation of application No. 07/977,404, filed on Mar. 1, 1993, now abandoned.

(30) Foreign Application Priority Data

Jul. 4, 1991 (EP) .............................. 91111094

(51) Int. Cl.$^7$ .............................................. C09K 19/30
(52) U.S. Cl. ........................ 252/299.63; 252/299.66; 359/103
(58) Field of Search ................. 252/299.63, 299.66; 359/103

(56) References Cited

U.S. PATENT DOCUMENTS

| | | | |
|---|---|---|---|
| 4,871,469 A | | 10/1989 | Reiffenrath et al. |
| 5,032,313 A | | 7/1991 | Goto et al. |
| 5,064,567 A | | 11/1991 | Funada et al. |
| 5,122,295 A | | 6/1992 | Weber et al. |
| 5,171,469 A | * | 12/1992 | Hittich et al. ......... 252/299.01 |
| 5,178,790 A | * | 1/1993 | Weber et al. ......... 252/299.01 |
| 5,194,178 A | | 3/1993 | Coates et al. |
| 5,308,541 A | * | 5/1994 | Hittich et al. ......... 252/299.63 |
| 5,350,535 A | * | 9/1994 | Rieger et al. ......... 252/299.63 |
| 5,368,772 A | * | 11/1994 | Rieger et al. ......... 252/299.63 |
| 5,378,395 A | * | 1/1995 | Weber et al. ......... 252/299.63 |
| 5,397,505 A | * | 3/1995 | Rieger et al. ......... 252/299.67 |
| 5,409,637 A | * | 4/1995 | Rieger et al. ......... 252/299.63 |

* cited by examiner

*Primary Examiner*—Cynthia H. Kelly
(74) *Attorney, Agent, or Firm*—Millen, White, Zelano & Branigan, P.C.

(57) ABSTRACT

A MIM-liquid crystal display comprising
   a MIM diode array,
   a pair of parallel substrates and a nematic liquid crystalline medium disposed between the pair of substrates, characterized in that the nematic liquid crystalline medium is based on
   a) a component A comprising one or more compounds of the formula I

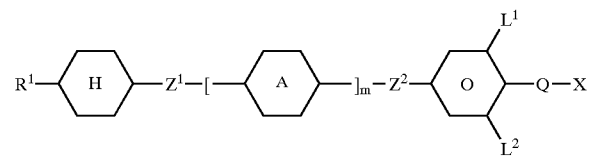

b) a component B comprising one or more compounds of the formula II

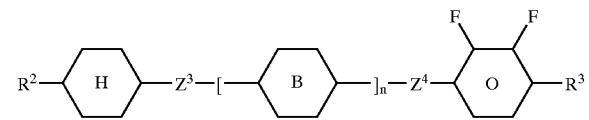

in which $R^1$, $R^2$, $R^3$, $Z^1$, $Z^2$, $Z^3$, $Z^4$,

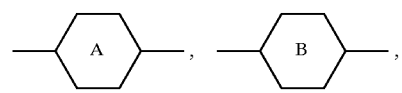

Q, X, $L^1$, $L^2$, m and n have the meaning given herein.

12 Claims, No Drawings

LIQUID-CRYSTALLINE MEDIUM

This is a continuation, of the application Ser. No. 07/977,404 filed Mar. 1, 1993 now abandoned.

The present invention relates to a MIM (Metal-Insulator-Metal Diode addressed Matrix) liquid crystal display, and to a nematic liquid-crystalline medium used in this display.

BACKGROUND OF THE INVENTION

Liquid crystals are used, in particular, as dielectrics in display devices since the optical properties of such substances can be affected by an applied voltage. Electrooptical devices based on liquid crystals are extremely well known to those skilled in the art and may be based on various effects. Devices of this type are, for example, cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The most common display devices are based on the Schadt-Helfrich effect and have a twisted nematic structure.

The liquid-crystal materials must have good chemical and thermal stability and good stability toward electrical fields and electromagnetic radiation. Furthermore, the liquid-crystal materials should have low viscosity and give short addressing times, low threshold voltages and high contrast in the cells. Furthermore, they should have a suitable mesophase, for example, for the above mentioned cells, a nematic or cholesteric mesophase, at customary operating temperatures, i.e. in the broadest possible range above and below room temperature. Since liquid crystals are generally used as mixtures of a plurality of components, it is important that the components are readily miscible with one another. Further properties, such as electrical conductivity, dielectric anisotropy and optical anisotropy, must meet various requirements depending on the cell type and the area of application. For example, materials for cells having a twisted nematic structure should have positive dielectric anisotropy and low electrical conductivity.

For example, the media desired for matrix liquid-crystal displays containing integrated nonlinear elements for switching individual image points (MLC displays) are those having high positive dielectric anisotropy, broad nematic phases, relatively low birefringence, very high specific resistance, good UV and temperature stability of the resistance and low vapor pressure.

MIM displays [J. G. Simmons, Phys. Rev. Vol. 155, No. 3, pp. 657–660; K. Niwa et al., SID 84 Digest, pp. 304–307, June 1984] of this type are particularly suitable for TV applications (for example pocket TV sets) or for high-information displays for computer applications (laptops) and in automobile or aircraft construction. In addition to problems with respect to the angle dependency of the contrast and the switching times, problems result in MIM displays due to inadequate specific resistance of the liquid-crystal mixtures. As the resistance decreases, the contrast of an MIM display worsens and the problem of "after image elimination" may occur. Since the specific resistance of the liquid-crystal mixture generally decreases over the life of an MIM display due to interaction with the internal surfaces of the display, a high (initial) resistance is very important to give acceptable service lives. In particular, in the case of low-voltage mixtures, it was hitherto not possible to achieve very high specific resistances. It is furthermore important that the specific resistance increases as little as possible with increasing temperature and after heating and/or exposure to UV radiation. The MIM displays of the prior art do not satisfy current demands.

A serious problem in fabricating the MIM diode addressed matrix liquid crystal display panel which has a large number of scanning electrodes is to reduce stray capacitances which are parallel to the MIM diodes. A higher addressing voltage is required if this capacitance is too large as compared with the capacitance of the pixel to be addressed with the MIM diode. Furthermore, the capacitance of the MIM diodes must be small relative to that of the pixels in order to hold the voltage across the pixels constant while the pixel is in the non-selected state. Otherwise, undesired voltages will be applied across the pixels of the non-selected scanning line, since many pixels are connected in the same electrode.

One possible solution of this problem is to use a special sandwich construction the so-called "lateral MIM diode" [S. Morozumi et al., Japan Display '83, pp. 404–407, 1983].

Another approach for the solution of this problem is the application of liquid-crystalline media with relatively high capacitances.

It was hitherto possible to prepare liquid-crystalline media with values for birefringence and phase range (e.g. clearing point: $\geq 70°$) which are required for practical use, but only with relatively low capacitances of the liquid-crystalline media, if value is placed on values of about 98% for the holding ratio under extreme conditions (e.g. after exposure to UV).

Thus, there continues to be a great demand for MIM displays of very high specific resistance, high capacitances and at the same time a broad operating temperature range, short switching times and low threshold voltage which do not have these disadvantages or only do so to a lesser extent.

For TN (Schadt-Helfrich) cells, media are desired which facilitate the following advantages in the cells:

broadened nematic phase range (in particular down to low temperatures), switchability at extremely low temperatures (outdoor use, automobiles, avionics), increased stability to UV radiation (longer life)

The media available from the prior art do not make it possible to achieve these advantages whilst simultaneously retaining the other parameters.

SUMMARY OF THE INVENTION

The invention has the object of providing media, in particular for MIM displays of this type, which do not have the above mentioned disadvantages or only do so to a lesser extent, and preferably at the same time have very high specific resistances and low threshold voltages.

It has now been found that this object can be achieved if media according to the invention are used in displays.

The invention relates to a MIM-liquid crystal display comprising a MIM diode array, a pair of parallel substrates and a nematic liquid crystalline medium disposed between the pair of substrates, characterized in that the nematic liquid crystalline medium is based on a) a component A comprising one or more compounds of the formula I

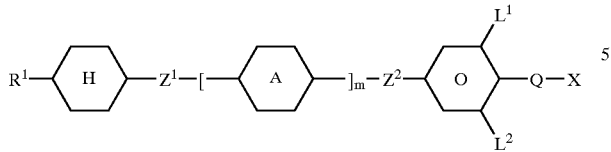

wherein
R$^1$ is alkyl, alkoxy, alkenyloxy, oxaalkyl or alkenyl with 1 to 15 C atoms,
Q is CF$_2$, OCF$_2$, OCF$_2$CF$_2$ or a single bond,
X is F or Cl
Z$^1$ and Z$^2$ are each independently —C≡C—, —CH$_2$CH$_2$— or a single bond,

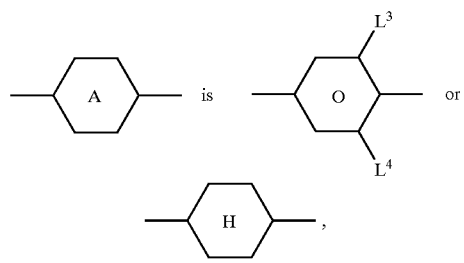

L$^1$, L$^2$,
L$^3$ and L$^4$ are each independently H or F, and
m is 0 or 1,
b) a component B comprising one or more compounds of the formula II

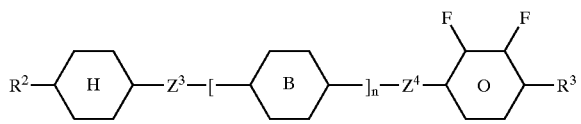

wherein
R$^2$ has the meaning for R$^1$,
R$^3$ has the meaning of R$^1$ or X—Q,
Z$^3$ and Z$^4$ are each independently —CO—O—, —CH$_2$—O—, —C≡C— or a single bond,

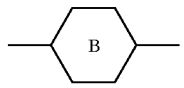

has the meaning given for

and
n is 0 or 1.

The invention relates to a nematic liquid-crystal medium of the above given composition.

The liquid-crystal MIM displays according to the invention facilitate a significant broadening of the parameter latitude available.

The achievable combinations of clearing point, viscosity at low temperature, thermal and UV stability and dielectric anisotropy or threshold voltage are far superior to previous materials from the prior art.

DETAILED DESCRIPTION OF THE INVENTION

The requirement for a high clearing point, a nematic phase at −40° C. and a moderate Δε and a high value of ε$_⊥$ was previously only achievable to an unsatisfactory extent. Although systems such as, for example ZLI-4163, have a comparable clearing point and comparatively favorable viscosities, they show, no sufficient properties on time constant of voltage attenuation and stability of electric current for the temperature and humidity test.

Other mixture systems have comparable viscosities and values of Δε, but only have clearing points in the region of 60° C.

The liquid-crystal mixtures according to the invention make it possible to achieve, at low viscosities at low temperatures (at −20° C.≦600, preferably ≦550 mm$^2$/s; at −30° C.≦1800, preferably ≦1700 mm$^2$/s), simultaneously dielectric constant perpendicular to the longitudinal molecular axes, ε$_⊥$≧4.5, preferably ≧5.0, clearing points above 65°, preferably above 85°, and a high value for the specific resistance, which means that excellent MIM displays can be achieved.

It goes without saying that a suitable choice of the components of the mixtures according to the invention also allows higher clearing points (for example above 90°) to be achieved at higher threshold voltages or lower clearing points to be achieved at lower threshold voltages while retaining the other advantageous properties. The MIM displays according to the invention preferably operate in the first transmission minimum of Gooch and Tarry [C. H. Gooch and H. A. Tarry, Electron. Lett. 10, 2–4, 1974; C. H. Gooch an H. A. Tarry, Appl. Phys., Vol. 8, 1575–1584, 1975], in this case, a lower dielectric anisotropy in the second minimum is sufficient in addition to particularly favorable electrooptical properties, such as, for example, high gradient of the characteristic line and low angle dependency of the contrast (German Patent 30 22 818) at the same threshold voltage as in an analogous display. The optical pathway d·Δn of the inventive MIM displays is between 0.35 and 0.5, preferably between 0.35 and 0.45. This allows significantly higher specific resistances to be achieved in the first minimum using the mixtures according to the invention than using mixtures containing cyano compounds. A person skilled in the art can use simple routine methods to produce the birefringence necessary for a prespecified cell thickness of the MIM display by a suitable choice of the individual components and their proportions by weight.

The viscosity at 20° C. is preferably ≦25 mPa·s. The nematic phase range is preferably at least 90°, in particular at least 110°. This range preferably extends at least from −30° to +80°.

Measurements of the "capacity holding ratio" (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention containing compounds of the formula I exhibit a considerably smaller decrease in the HR with increasing temperature than do analogous mixtures in which the compounds of the formula I are replaced by cyanophenylcyclohexanes of the formula

The UV stability of the mixtures according to the invention is also considerably better, i.e. they exhibit a significantly smaller decrease in the HR on exposure to UV radiation.

The threshold voltages $V_{10/0/20}$ achieved are generally $\leq 2.85$ volts and are preferably in the range 2.1 to 2.8 volts.

The media according to the invention are preferably based on a plurality (preferably two or more) of compounds of the formula I, i.e. the proportion of these compounds is $\geq 25\%$, preferably $\geq 40\%$.

The individual compounds of the formulae I and II and their sub-formulae which can be used in the media according to the invention are either known or can be prepared analogously to the known compounds.

Preferred embodiments are indicated below:

a medium contains one or more compounds selected from the group comprising the general formulae Ia to Ii

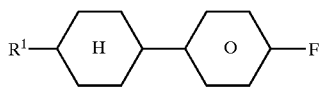

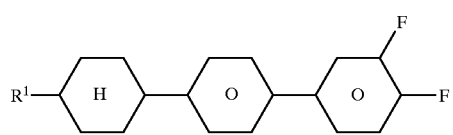

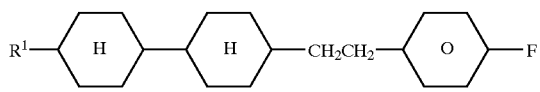

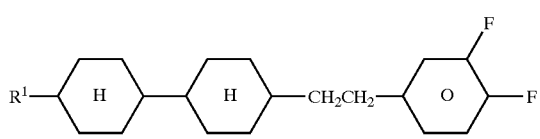

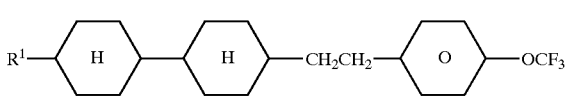

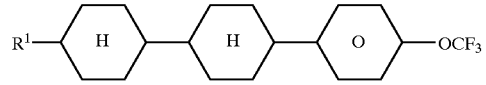

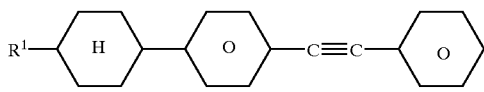

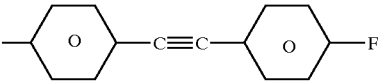

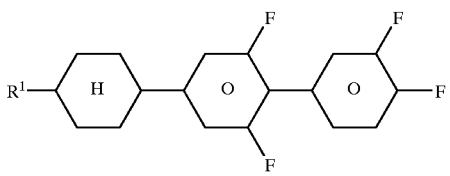

a medium contains one or more compounds selected from the group comprising the general formulae IIa to IId

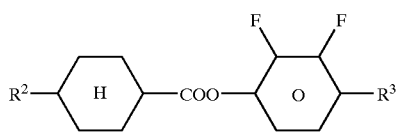

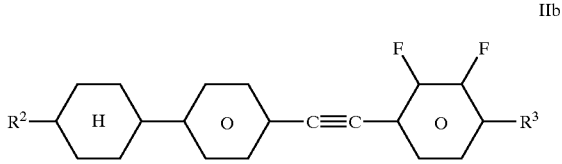

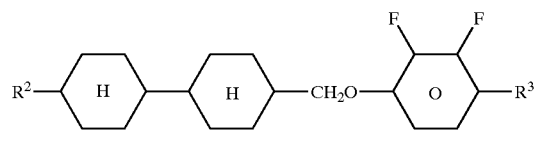

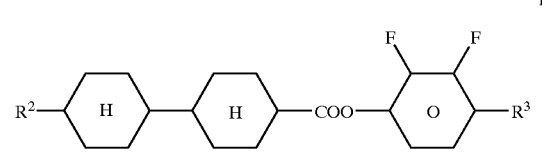

It has been found that even a relatively small Proportion of compounds of the formulae I and II mixed with conventional liquid-crystal materials results in a significant improvement in the addressing times and in low threshold voltages, and at the same time broad nematic phases with low smectic-nematic transition temperatures are observed.

The term "alkyl" covers straight-chain and branched alkyl groups having 1–7 carbon atoms, in particular the straight-chain groups methyl, ethyl, propyl, butyl, pentyl, hexyl, heptyl, octyl, nonyl and decyl. Groups having 2–5 carbon atoms are generally preferred.

The term "alkenyl" covers straight-chain and branched alkenyl groups having 2–7 carbon atoms, in particular the straight-chain groups. Preferred alkenyl groups are $C_2$–$C_7$-1E-alkenyl, $C_4$–C7-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–C7-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

Through a suitable choice of the meanings of $R^1$, $R^2$, $R^3$,

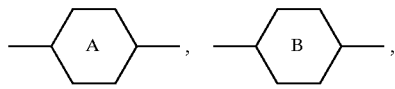

$Z^1$, $Z^2$, $Z^3$, $Z^4$, $L^1$, $L^2$, Q and X, the times, the threshold voltage, the gradient of the transmission characteristic lines, etc., can be modified as desired. For example, 1E-alkenyl radicals, 3E-alkenyl radicals, 2E-alkenyloxy radicals and the like generally give shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. A —$CH_2CH_2$— group in $Z^1$ and $Z^2$ generally results in higher values of $k_{33}/k_{11}$ compared with a simple covalent bond. Higher values of $k_{33}/k_{11}$ facilitate, for example, flatter transmission characteristic lines in MIM cells.

The optimum mixing ratios of the compounds of the formulae I and II depends substantially on the desired properties, on the choice of the components of the formulae I and II and on the choice of any other components which may be present. Suitable mixing ratios within the above mentioned range can easily be determined from case to case.

The total amount of compounds of the formulae I to II in the mixtures according to the invention is not crucial. The mixtures may therefore contain one or more further components in order to optimize various properties. However, the effect observed on the addressing times and the threshold voltage is generally greater the higher the total concentration of compounds of the formulae I to II.

In a particularly preferred embodiment, the media according to the invention contain compounds of the formula I in which Q—X is $CF_3$, $OCF_3$ or $OCHF_2$. A favorable synergistic effect with the compounds of the formula in which Q—X is F results in particularly advantageous properties.

The media according to the invention may furthermore contain a component C comprising one or more compounds of the general formula III having a dielectric anisotropy of from –1.5 to +1.5

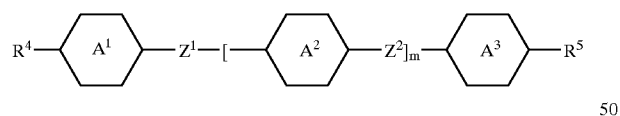

in which
$R^4$ and $R^5$ are each, independently of one another, n-alkyl, n-alkoxy, ω-fluoroalkyl or n-alkenyl having up to 9 carbon atoms,
the rings $A^1$,
$A^2$ and $A^3$ are each, independently of one another, 1,4-phenylene, 2- or 3-fluoro-1,4-phenylene, trans-1,4-cyclohexylene or 1,4-cyclohexenylene,
$Z^1$ and $Z^2$ are each, independently of one another, —$CH_2CH_2$—, —C≡C—, —CO—O—, —O—CO— or a single bond,
and
m is 0, 1 or 2.

Component C preferably contains one or more compounds selected from the group comprising III1 to III7:

III1
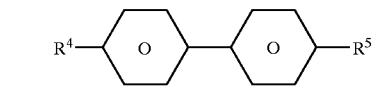

III2
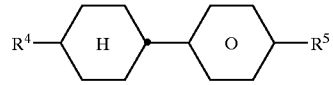

III3
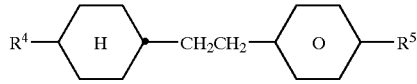

III4
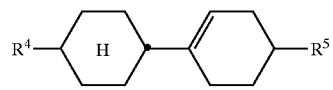

III5
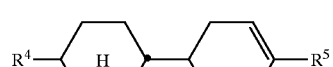

III6

III7
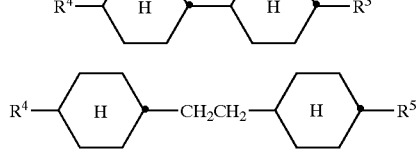

in which $R^4$ and $R^5$ are as defined under formula III.

Component A preferably additionally contains one or more compounds selected from the group comprising III8 to III20:

III8
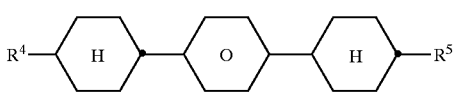

III9
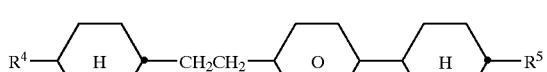

III10

III11
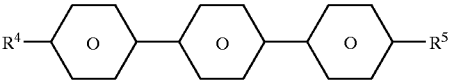

III12
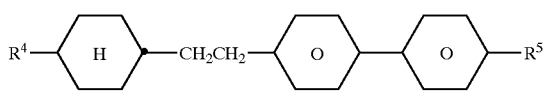

III13

III14
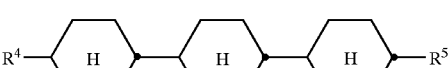

-continued

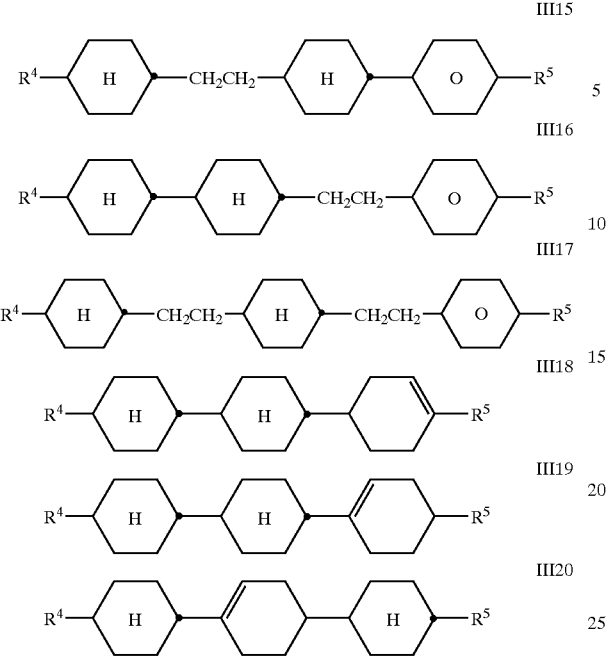

in which $R^4$ $R^5$ are as defined under formula III, and the 1,4-phenylene groups in III8 to III17 may each, independently of one another, also be monosubstituted or polysubstituted by fluorine.

Furthermore, component C preferably additionally contains one or more compounds selected from the group comprising III21 to III25:

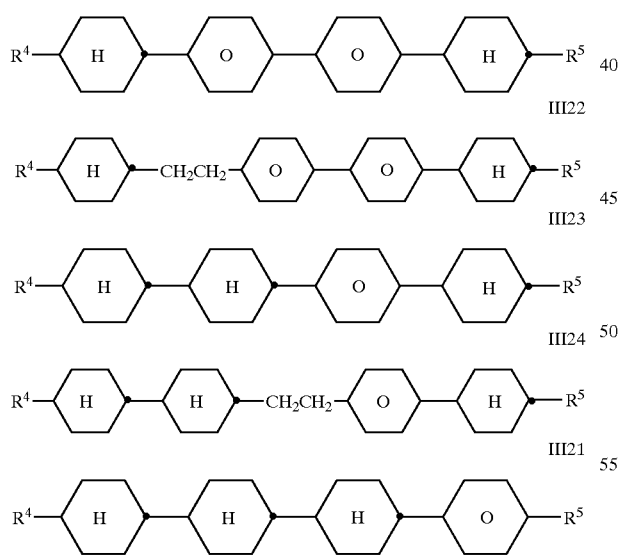

in which $R^4$ and $R^5$ are as defined under formula III, and the 1,4-phenylene groups in IIII21 to III25 may also each independently of one another, be monosubstituted or polysubstituted by fluorine.

Finally, preferred mixtures of this type are those in which component C contains one or more compounds selected from the group comprising III26 to III27:

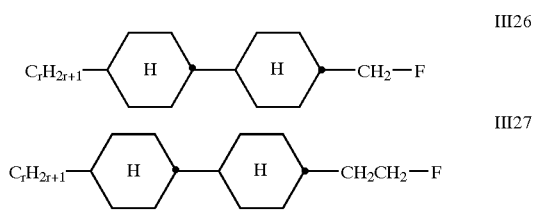

in which $C_rH_{2r+1}$ is a straight-chain alkyl group having up to 7 carbon atoms.

In some cases, the addition of compounds of the formula

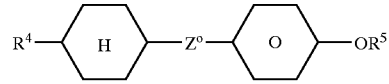

in which
$R^4$ and $R^5$ are as defined under formula III
and
$Z^0$ is a single bond,

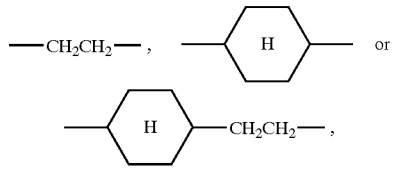

proves advantageous for suppressing smectic phases, although this may reduce the specific resistance. In order to achieve parameter combinations which are ideal for the application, a person skilled in the art can easily determine whether and, if yes, in what amount these compounds may be added. Normally, less than 15%, in particular 5–10%, are used.

The type and amount of the polar compounds having positive dielectric anisotropy is not crucial per se. A person skilled in the art can use simple routine experiments to select suitable materials from a wide range of known and, in many cases, also commercially available components and base mixtures. The component A of the media according to the invention preferably contains one or more compounds of the formula I, in addition to the compounds of the formula I'

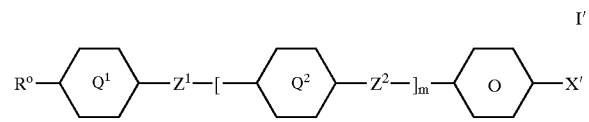

in which $Z^1$, $Z^2$ and m are as defined under the formula I, $Q^1$ and $Q^2$ are each, independently of one another, 1,4-phenylene, trans-1,4-cyclohexylene or 3-fluoro-1,4-phenylene, and one of the radicals $Q^1$ and $Q^2$ is alternatively trans-1,3-dioxane-2,5-diyl, pyrimidine-2,5-diyl, pyridine-2,5-diyl or 1,4-cyclohexenylene, $R^0$ is n-alkyl, n-alkenyl, n-alkoxy or n-oxaalkyl, in each case having up to 9 carbon atoms, Y is H or F and X' is CN, halogen, $CF_3$, $OCF_3$ or $OCHF_2$.

In a preferred embodiment, the media according to the invention for MIM applications are based on compounds of the formula I' in which X' is CN. It goes without saying that smaller or larger proportions of other compounds of the formula I' (X'≠CN) are also possible. For MIM applications, the media according to the invention preferably contain only up to about 10% of nitrites of the formula I' (but preferably no nitrites of the formula I', but instead compounds of the formula I', where X'=halogen, $CF_3$, $OCF_3$ or $OCHF_2$). These media are preferably based on the compounds of the formulae I, I' and II.

The component B of the media according to the invention preferably contains one or more compounds which have a structure element of the formula

preferably compounds of the formula IV

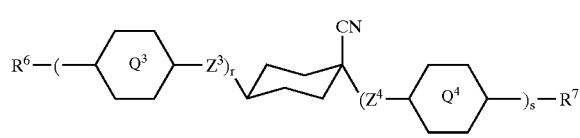

IV in which $R^6$ and $R^7$ have the same meaning as $R^4$ and $R^5$, $Z^3$ and $Z^4$ have the meaning given for formula II and

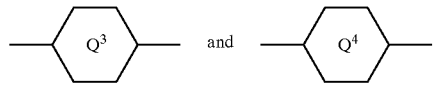

have the same meaning as

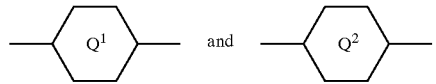

and r and s are each independently 0, 1, 2 or 3, the sum of r and s being at least 1.

In a preferred embodiment, the media according to the invention are based on compounds of the formula IV. For MIM applications the media according to the invention preferably contain only up to about 10% of compounds of the formula IV.

The construction of the MIM displays according to the invention from polarizers, electrode base plates and electrodes with surface treatment corresponds to the construction which is conventional for displays of this type. The term conventional construction here is widely drawn and also covers all derivatives and modifications of the MIM display, in particular also lateral MIMS.

An essential difference between the displays according to the invention and those customary hitherto based on the twisted nematic cell is, however, the choice of liquid-crystal parameters in the liquid-crystal layer.

The liquid-crystal mixtures which can be used according to the invention are prepared in a manner which is conventional per se. In general, the desired amount of the components used in the lesser amount is dissolved in the components making up the principal constituent, expediently at elevated temperature. It is also possible to mix solutions of the components in an organic solvent, for example in acetone, chloroform or methanol, and, after thorough mixing, to remove the solvent again, for example by distillation.

The dielectrics may also contain other additives known to those skilled in the art and described in the literature. For example, 0–15% of pleochroic dyes or chiral dopes can be added.

C denotes a crystalline phase, S a smectic phase, $S_B$ a smectic B phase, N a nematic phase and I the isotropic phase.

$V_{10}$ denotes the voltage for 10% transmission (view angle perpendicular to the plate surface). $t_{on}$ denotes the switch-on time and $t_{off}$ the switch-off time at an operating voltage corresponding to 2.5 times the value of $V_{10}$. $\Delta n$ denotes the optical anisotropy and no the refractive index. $\Delta\epsilon$ denotes the dielectric anisotropy $\Delta\epsilon=\epsilon_{\parallel}-\epsilon_{\perp}$, where $\epsilon_{\parallel}$ denotes the dielectric constant parallel to the longitudinal molecular axes and $\epsilon_{\perp}$ denotes the dielectric constant perpendicular thereto. The electrooptical data were measured in a TN cell at the 1st minium (i.e. at a d·$\Delta$n value of 0.5) at 20° C., unless expressly stated otherwise. The optical data were measured at 20° C., unless expressly stated otherwise.

The examples below are intended to illustrate the invention without representing a limitation. Above and below all temperatures are given in ° C. The percentages are percent by weight.

In the present application and in the examples below, the structures of the liquid-crystal compounds are indicated by acronyms, with the transformation into chemical formulae taking place in accordance with Tables A and B below. The structures given in Tables A and B are preferred components of the inventive nematic media. All radicals $C_nH_{2n+1}$ are straight-chain alkyl radicals containing n or m carbon atoms. The coding in Table B is self-evident. In Table A, only the acronym for the base structure is given. In individual cases, the acronym for the base structure is followed, separated by a hyphen, by a code for the substituents, $R^1$, $R^2$, $L^1$, $L^2$ and $L^3$.

| Code for $R^1, R^2,$ $L^1, L^2, L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | F | H |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | F | H |

-continued

| Code for R¹, R², L¹, L², L³ | R¹ | R² | L¹ | L² | L³ |
|---|---|---|---|---|---|
| nOmFF | $C_nH_{2n+1}$ | $OC_mH_{2m+1}$ | F | F | H |
| nmF | $C_nH_{2n+1}$ | $C_mH_{2m+1}$ | F | H | H |
| nCF₃ | $C_nH_{2n+1}$ | $CF_3$ | H | H | H |
| nOCF₃ | $C_nH_{2n+1}$ | $OCF_3$ | H | H | H |
| nOCF₂ | $C_nH_{2n+1}$ | $OCHF_2$ | H | H | H |
| nS | $C_nH_{2n+1}$ | NCS | H | H | H |
| rVsN | $C_rH_{2r+1}-CH=CH-C_sH_{2s}-$ | CN | H | H | H |
| rEsN | $C_rH_{2r+1}-O-C_sH_{2s}-$ | CN | H | H | H |
| nNF | $C_nH_{2n+1}$ | CN | F | H | H |
| nAm | $C_nH_{2n+1}$ | $COOC_mH_{2m+1}$ | H | H | H |
| nF.F.F | $C_nH_{2n+1}$ | F | H | F | F |
| nCl.F.F | $C_nH_{2n+1}$ | Cl | H | F | F |
| NCF₃.F.F | $C_nH_{2n+1}$ | $CF_3$ | H | F | F |
| nOCF₃.F.F | $C_nH_{2n+1}$ | $OCF_3$ | H | F | F |
| nOCF₂.F.F | $C_nH_{2n+1}$ | $OCHF_2$ | H | F | F |
| nOCF₃.F | $C_nH_{2n+1}$ | $OCF_3$ | H | F | H |

TABLE A

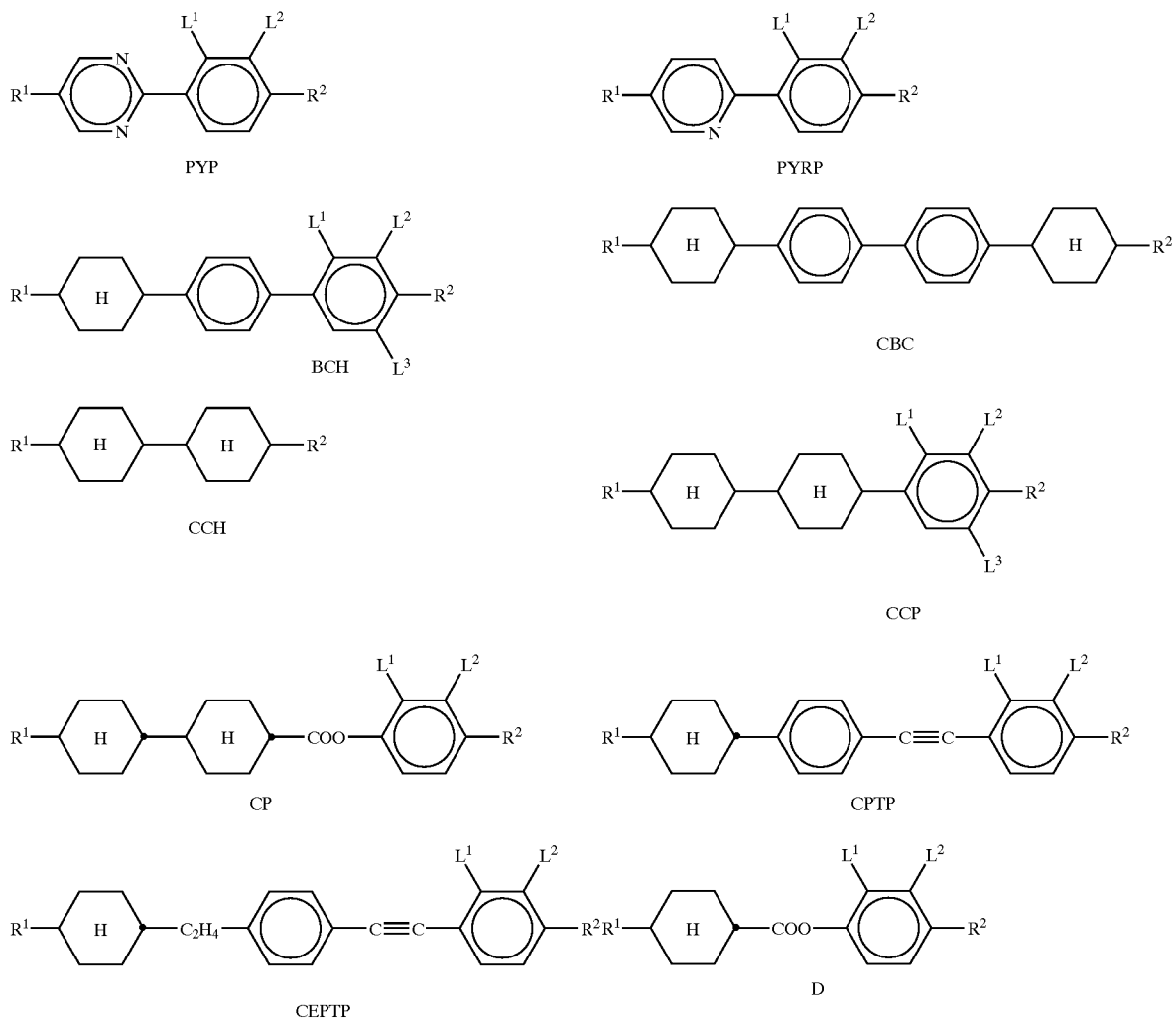

TABLE A-continued
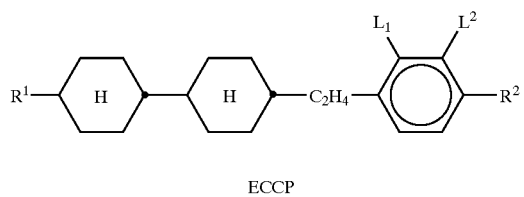
ECCP
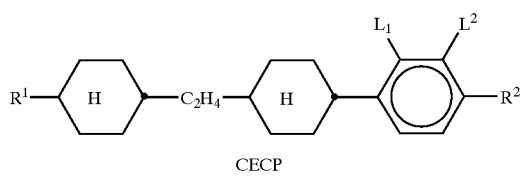
CECP
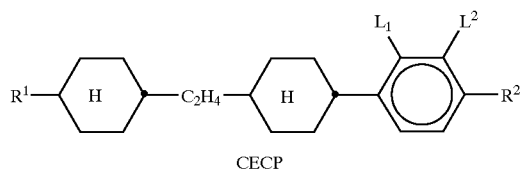
CECP
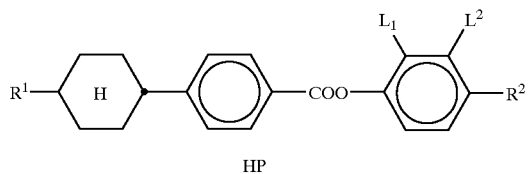
HP
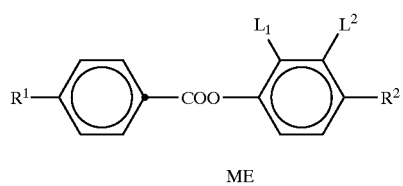
ME
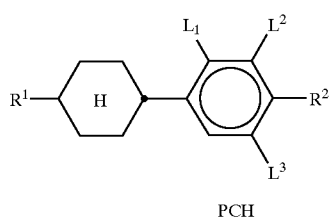
PCH
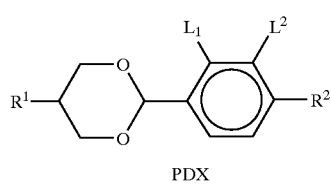
PDX
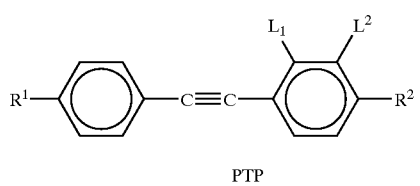
PTP
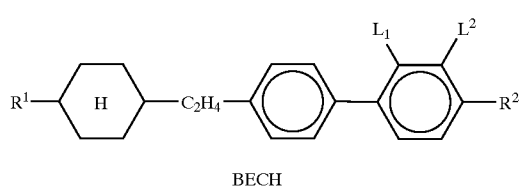
BECH
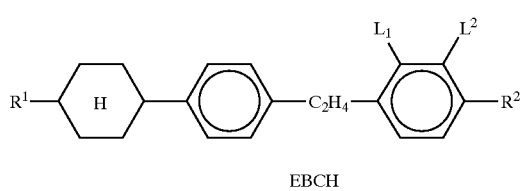
EBCH
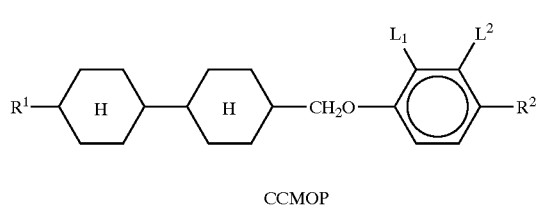
CCMOP
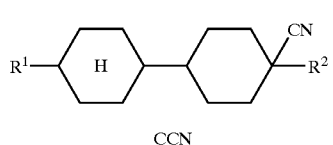
CCN
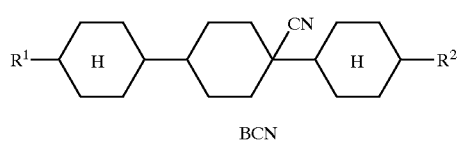
BCN
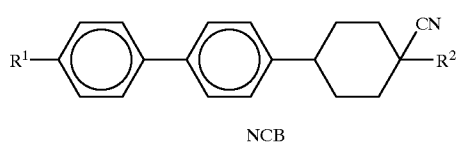
NCB
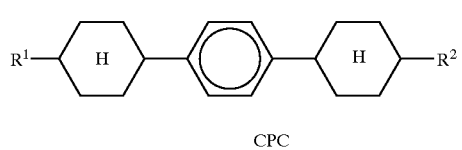
CPC TABLE A-continued
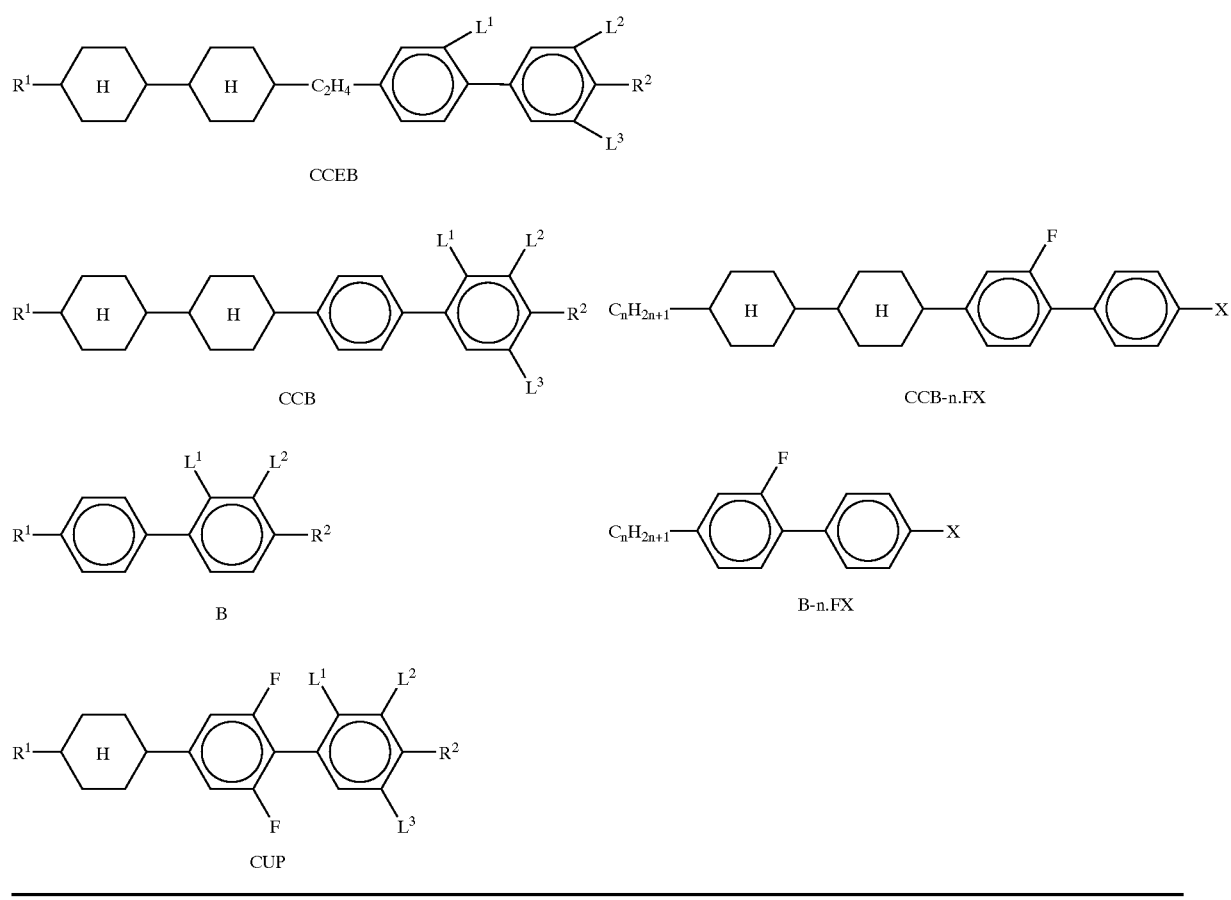
TABLE B
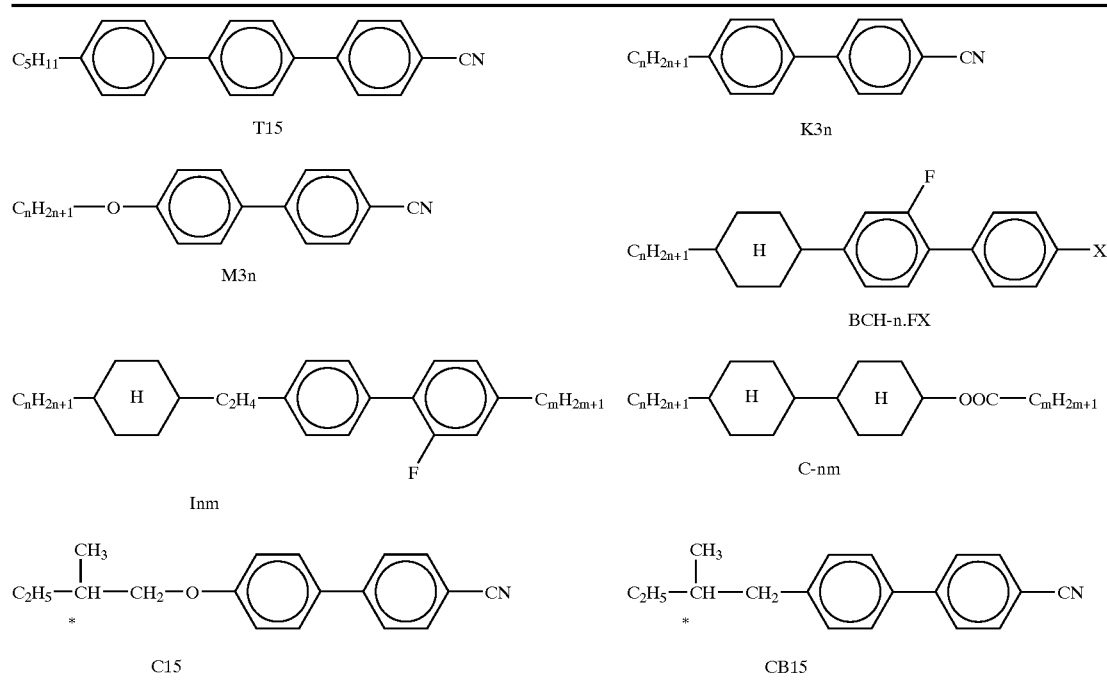

TABLE B-continued
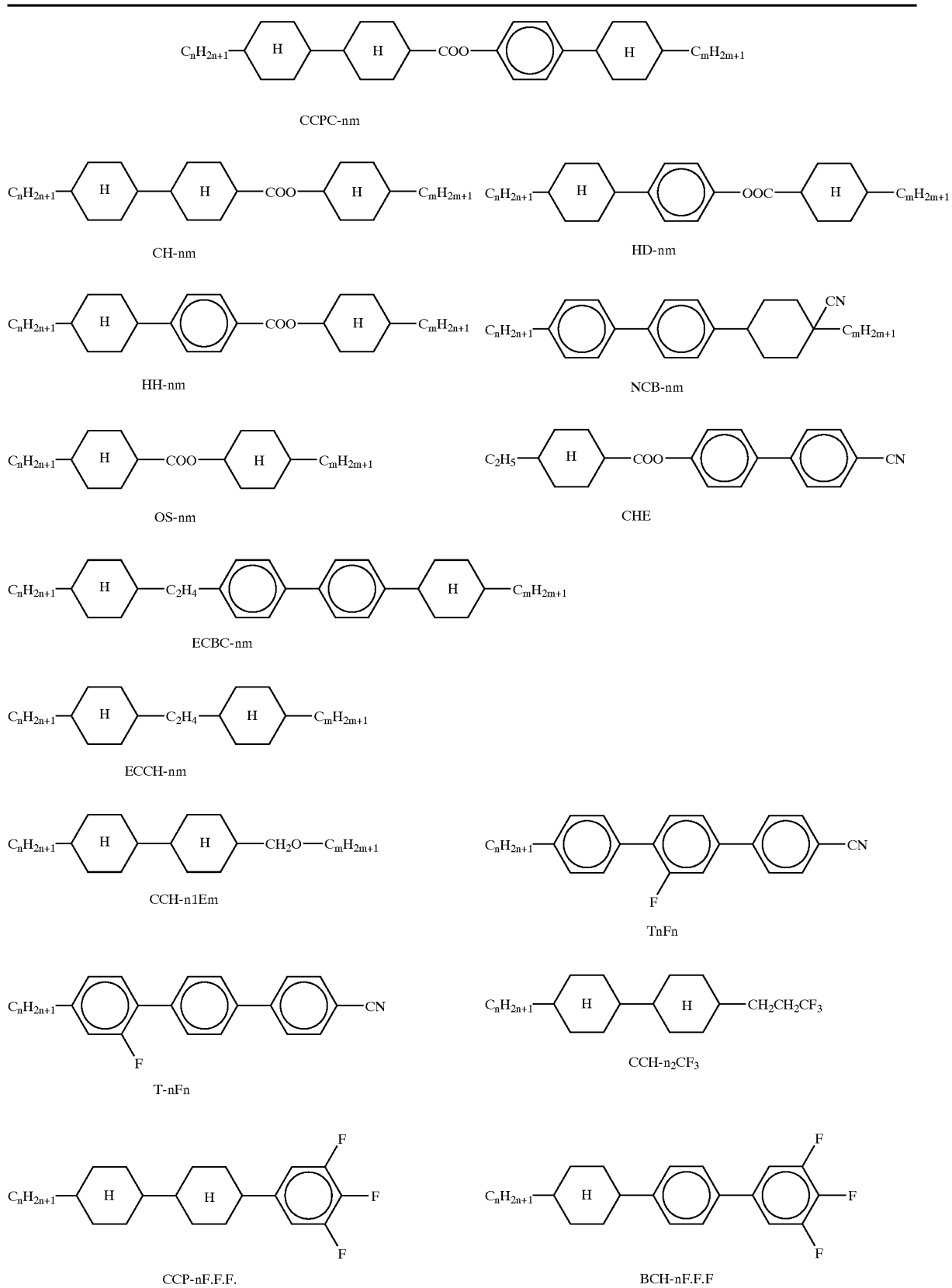

TABLE B-continued

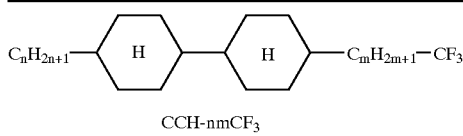

CCH-nmCF$_3$

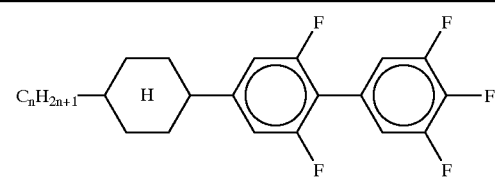

CUP-nF.F

PTP-nOF

EXAMPLE 1

| | | | |
|---|---|---|---|
| PCH-6F | 10% | S < −30 N 96 I | |
| PCH-7F | 10% | Δn | 0.1233 |
| CCP-30CF$_3$ | 12% | Δε | +3.5 |
| CCP-50CF$_3$ | 13% | ε$_\perp$ | 4.9 |
| BCH-3F.F | 15% | Viscosity (20° C.): 20 mm$^2$/s | |
| BCH-5F.F | 15% | V$_{10}$ = 2.44 Volt | |
| D-302 FF | 11% | V$_{90}$ = 3.40 Volt | |
| CPTP-302 FF | 7% | | |
| CPTP-502 FF | 7% | | |

EXAMPLE 2

| | | | |
|---|---|---|---|
| PCH-6F | 12% | S < −30 N 94 I | |
| PCH-7F | 11% | Δn | 0.1365 |
| CCP-30CF$_3$ | 12% | Δε | +3.6 |
| CPTP-30CF$_3$ | 10% | ε$_\perp$ | 4.9 |
| BCH-3F.F | 15% | Viscosity (20° C.): 22 mm$^2$/s | |
| BCH-5F.F | 15% | V$_{10}$ = 2.40 Volt | |
| D-302 FF | 11% | V$_{90}$ = 3.40 Volt | |
| CPTP-302 FF | 7% | | |
| CPTP-502 FF | 7% | | |

EXAMPLE 3

| | | | |
|---|---|---|---|
| PCH-6F | 9% | S < −40 N 91 I | |
| PCH-7F | 9% | Δn | 0.1167 |
| CCP-30CF$_3$ | 11% | Δε | +2.6 |
| CCP-50CF$_3$ | 12% | ε$_\perp$ | 5.5 |
| BCH-3F.F | 14% | Viscosity (20° C.): 23 mm$^2$/s | |
| BCH-5F.F | 15% | V$_{10}$ = 2.71 Volt | |
| D-302 FF | 8% | V$_{90}$ = 3.77 Volt | |
| CPTP-302 FF | 7% | | |
| CPTP-502 .FF | 7% | | |
| CCN-33 | 8% | | |

EXAMPLE 4

| | | | |
|---|---|---|---|
| PCH-3F | 6% | S < −40 N 108 I | |
| PCH-6F | 7% | Δn | 0.1181 |
| PCH-7F | 7% | Δε | +3.1 |
| CCP-30CF$_3$ | 8% | ε$_\perp$ | 5.7 |
| CCP-50CF$_3$ | 11% | Viscosity (20° C.): 22 mm$^2$/s | |
| ECCP-3F.F | 13% | V$_{10}$ = 2.82 Volt | |
| ECCP-5F.F | 13% | V$_{90}$ = 3.96 Volt | |
| D-302 FF | 13% | | |
| CP-302 FF | 3% | | |
| CPTP-302 FF | 9% | | |
| CPTP-502 FF | 10% | | |

EXAMPLE 5

| | | | |
|---|---|---|---|
| PCH-5F | 10% | S < −0 N 91 I | |
| PCH-6F | 8% | Δn | 0.0952 |
| PCH-7F | 6% | Δε | +3.9 |
| CCP-20CF$_3$ | 8% | ε$_\perp$ | 4.2 |
| CCP-30CF$_3$ | 12% | V$_{10}$ = 2.61 Volt | |
| CCP-40CF$_3$ | 7% | V$_{90}$ = 3.41 Volt | |
| CCP-50CF$_3$ | 11% | | |
| BCH-3F.F | 12% | | |
| BCH-5F.F | 10% | | |
| CCMOP-502 FF | 14% | | |
| CBC-33F | 2% | | |

EXAMPLE 6

| | | | |
|---|---|---|---|
| PCH-6F | 6% | S < −20 N 92 I | |
| PCH-7F | 7% | Δn | 0.1381 |
| PCH-302 | 7% | Δε | +3.1 |
| CCP-30CF$_3$ | 5% | Viscosity (20° C.): 25 mm$^2$/s | |
| CPTP-30F$_3$ | 10% | V$_{10}$ = 2.62 Volt | |
| CPTP-50F$_3$ | 10% | V$_{90}$ = 3.63 Volt | |
| BCH-3F.F | 10% | | |
| BCH-5F.F | 10% | | |
| D-301 | 6% | | |
| D-302FF | 5% | | |
| D-402FF | 5% | | |
| D-502FF | 5% | | |
| BCH-52F | 5% | | |
| PTP-20F | 3% | | |
| PTP-40F | 2% | | |
| CBC-53F | 4% | | |

EXAMPLE 7

| | | | |
|---|---|---|---|
| PCH-6F | 6.0% | S < −30 N 91 I | |
| PCH-7F | 7.0% | Δn | 0.1357 |
| PCH-302 | 5.0% | Δε | +3.9 |
| CUP-3F.F | 5.0% | Viscosity (20° C.): 29 mm²/s | |
| CUP-5F.F | 5.0% | $V_{10}$ = 2.20 Volt | |
| CPTP-30CF₃ | 8.0% | $V_{90}$ = 3.19 Volt | |
| CPTP-50CF₃ | 8.0% | | |
| BCH-3F.F | 10.0% | | |
| BCH-5F.F | 12.0% | | |
| D-302FF | 7.0% | | |
| D-402FF | 6.0% | | |
| D-502FF | 7.0% | | |
| PTP-40F | 4.0% | | |
| CBC-33F | 5.0% | | |
| CBC-53F | 5.0% | | |

EXAMPLE 8

| | | | |
|---|---|---|---|
| PCH-6F | 6.0% | Clearing point | +91° C. |
| PCH-7F | 7.0% | Viscosity (+20° C.): | 29 mm²s⁻¹ |
| PCH-302 | 5.0% | Optical anisotropy | |
| CUP-3F.F | 5.0% | Δn | +0.1357 |
| CUP-5F.F | 5.0% | $n_e$ | 1.6234 |
| CPTP-30CF₃ | 8.0% | Dielectric anisotropy Δε | +3.9 |
| CPTP-50CF₃ | 8.0% | V (10, 0, 20) (Threshold) | 2.20 (1st) |
| BCH-3F.F | 10.0% | | |
| BCH-5F.F | 12.0% | | |
| D-302FF | 7.0% | | |
| D-402FF | 6.0% | | |
| D-502FF | 7.0% | | |
| PTP-40F | 4.0% | | |
| CBC-33F | 5.0% | | |
| CBC-53F | 5.0% | | |

What is claimed is:

1. A MIM-liquid crystal display comprising a MIM diode array, and a pair of parallel substrates having a nematic liquid crystalline medium disposed between the pair of substrates, wherein the nematic liquid crystalline medium exhibits a dielectric anisotropy of 3.0 to 4.0 and a dielectric constant perpendicular to the longitudinal molecular axes of ≧4.2, and comprises:

a) a component A comprising one or more compounds of the formula I

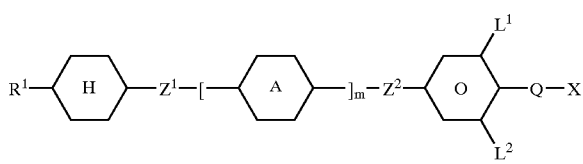

I wherein
$R^1$ is alkyl, alkoxy, alkenyloxy, oxaalkyl or alkenyl with 1 to 15 C atoms,
Q is $CF_2$, $OCF_2$, $OCF_2CF_2$ or a single bond,
X is F or Cl,
$Z^1$ is a single bond, and
$Z^2$ is —C≡C—, —CH₂CH₂— or a single bond,

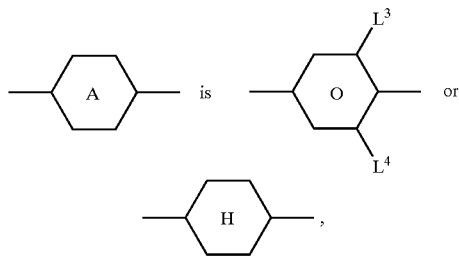

$L^1$, $L^2$,
$L^3$ and $L^4$ are each independently H or F, and
m is 0 or 1, and b) a component B comprising one or more compounds of the formula II

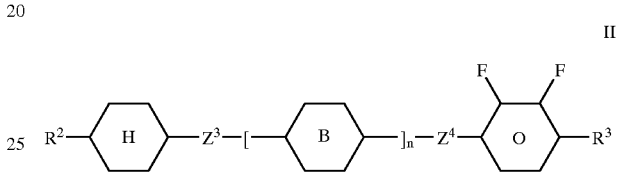

II wherein
$R^2$ has the meaning for $R^1$,
$Z^3$ is —CO—O—, —CH₂—O—, —C≡C— or a single bond,
$Z^4$ is —CO—O—, —CH₂O— or —C≡C—,

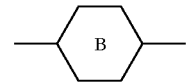

has the meaning given for

and
n is 0 or 1.

2. A MIM-liquid crystal display according to claim 1, wherein the nematic liquid crystalline medium exhibits a clearing point higher than 85° C.

3. A MIM-liquid crystal display according to claim 1, wherein the compound of the formula I is selected from the group consisting of the compounds of the formulae Ia to Ii:

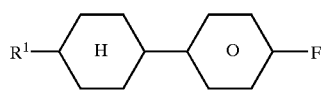

Ia

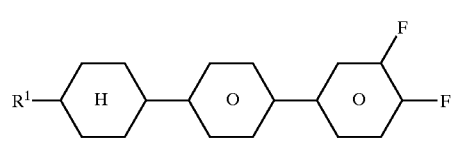

Ib

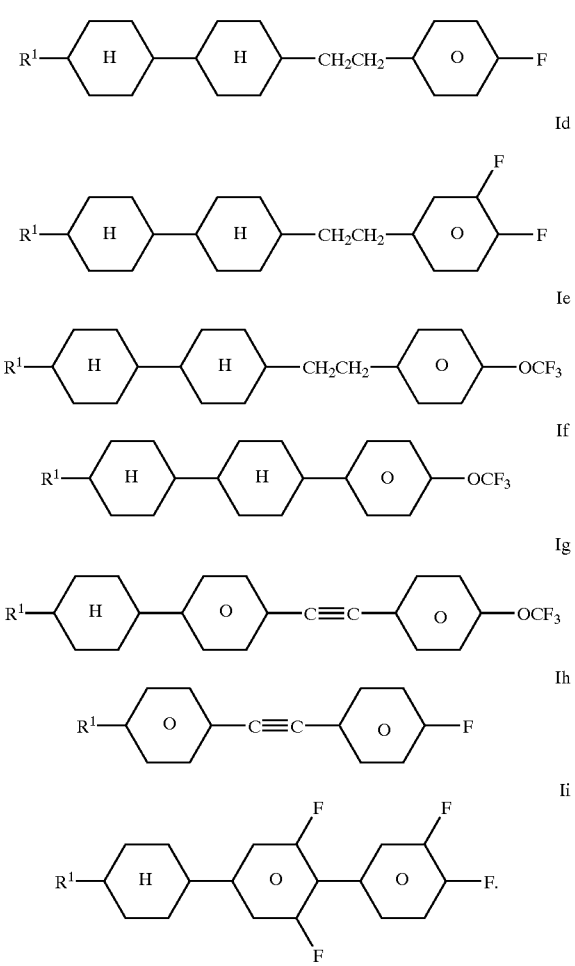

4. A MIM-liquid crystal display according to claim 1, wherein the compound of the formula II is selected from the group consisting of the compounds of the formulae IIa to IId

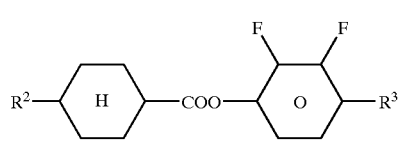

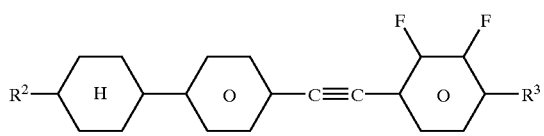

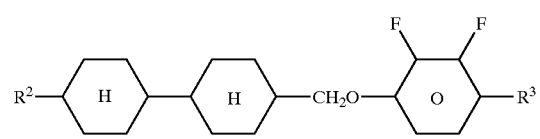

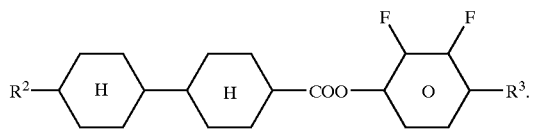

5. A MIM-liquid crystal display according to claim 1, wherein the nematic liquid crystalline medium exhibits a dielectric constant perpendicular to the longitudinal molecular axes $\geq 4.5$.

6. The MIM-liquid crystal display of claim 1, wherein the nematic liquid crystalline medium exhibits a dielectric constant perpendicular to the longitudinal molecular axes of $\geq 5.0$.

7. The MIM-liquid crystal display of claim 1, wherein the nematic liquid crystalline medium exhibits a clearing point of above 65° C.

8. The MIM-liquid crystal display of claim 1, having an optical pathway, d·Δn, of 0.35 to 5.0.

9. The MIM-liquid crystal display of claim 1, wherein the nematic liquid crystalline medium contains $\geq 25\%$ by weight of compounds of the formula I.

10. The MIM-liquid crystal display of claim 1, wherein the nematic liquid crystalline medium contains at least one compound of the formula I wherein at least one of $L^1$ or $L^2$ or, when m is 1 and

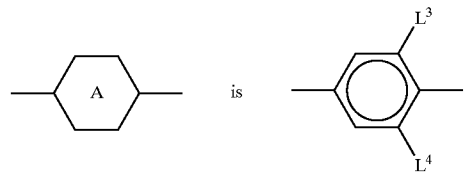

$L^3$ or $L^4$ is F.

11. The MIM-liquid crystal display of claim 1, wherein the nematic liquid crystalline medium contains at least one compound of the formula I wherein m is 0.

12. The MIM-liquid crystal display of claim 1, wherein the nematic liquid crystalline medium contains at least one compound of the formula I wherein m is 1 and

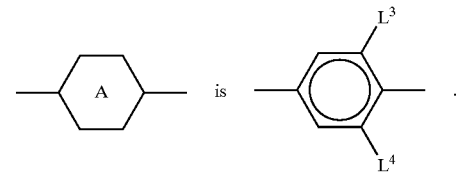

\* \* \* \* \*